US006333865B1

(12) United States Patent
Yumura et al.

(10) Patent No.: US 6,333,865 B1
(45) Date of Patent: Dec. 25, 2001

(54) POWER SUPPLYING DEVICE FOR PLURAL CAR ELEVATOR

(75) Inventors: Takashi Yumura; Masahiro Kimata, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/694,367

(22) Filed: Oct. 24, 2000

(51) Int. Cl.$^{7}$ .......................... H02M 7/5387; G05B 11/36

(52) U.S. Cl. ............................................ 363/132; 187/295

(58) Field of Search ................................ 363/132, 55, 58, 363/34; 187/249, 256, 257, 411, 902, 295

(56) References Cited

FOREIGN PATENT DOCUMENTS 4-84261 7/1992 (JP) .
5-338960 12/1993 (JP) .
9-56088 2/1997 (JP) .
9-202550 8/1997 (JP) .

*Primary Examiner*—Rajnikant D. Patel
(74) *Attorney, Agent, or Firm*—Leydig, Voit, & Mayer, Ltd.

(57) ABSTRACT

A power supplying device for a single hoistway, multiple car elevator, preventing the cable of one car from making contact with another car, without the need to increase the size of the hoistway. This power supplying device includes a power supplying member disposed at the top of a hoistway for supplying power to each of the elevator cars; power receiving members on each of the elevator cars for receiving power from the power supplying member; and cables for conducting the power from the power supplying member to each of the power receiving members. In this power supplying device, one end of each of the cables is fixed to the side of a corresponding elevator car, and each of the cables is disposed along the side of each of the cars in a gap between an inner wall of the hoistway and the side of each of the elevator cars opposed to the inner wall.

6 Claims, 12 Drawing Sheets

POWER SUPPLYING DEVICE FOR PLURAL CAR ELEVATOR

BACKGROUND OF THE INVENTION

1. Field of the Invention

The present invention relates to an elevator having a plurality of cars within one hoistway, and particularly to a power supplying device for a plural car elevator, the power supplying device supplying electricity to each of the cars.

2. Description of the Related Art

An elevator car is provided with electrical appliances such as lighting equipment, a ventilator, and an air-conditioner, and these electrical appliances need to be supplied with power.

FIG. 7 is a perspective view showing a power supplying device for an elevator which is now widely used. FIG. 8 is a transverse sectional view corresponding to FIG. 7.

This power supplying device for an elevator comprises a fixed-side power supplying member 3 (including a signal transmission function) disposed at the top of a hoistway 100; a power receiving member 5 disposed on a car 1 traveling within the hoistway 100 along guide rails 2, and a cable 4 for supplying power, the cables being lowered from the fixed-side power supplying member 3 toward the car 1, being fixed on the bottom surface of the car 1 via a upwardly-folded portion 80, and being electrically connected with the power receiving member 5.

The fixed-side power supplying member 3 is disposed in a machine house together with a winding machine driving the car 1, a control member, power source equipment, and the like, and transmits power or signals to the car 1 through the cable 4. Here, reference numeral 50 denotes a counter.

Since the folded portion 80 of the cable 4 is subjected to repeated deformations by successive up and down movements for a long time period (for example, 20 years), it requires a curvature to some extent in order to withstand the repeated deformations. Therefore, to pass through the narrow gap between the car 1 and the wall 101 of the hoistway 100, and to secure a curvature to some extent, the cable 4 is generally fixed on the bottom of the car 1.

However, as shown in FIG. 9 and FIG. 10A, when applying this system to a plural car elevator having first and second cars 1*a* and 1*b* within one hoistway 100, a problem arises that, once the cars 1*a* and 1*b* approach each other, the folded portion 80*a* of the first cable 4*a* of the first car 1*a* can make contact with the upper portion of the second car, so that the folded portion 80*a* can be caught on the second car 1*b*, resulting in a reduction in the lifetime.

As one solution to this problem, there is a suggestion that, as shown in FIG. 10B, for example, the installation positions of the first and second cables 4*a* and 4*b* are set to the sides of the first and second cars 1*a* and 1*b*, respectively. In this case, however, in order to obtain a bending curvature required for each of the cables 4*a* and 4*b*, it is necessary to secure a large space between the cars 1*a* and 1*b*, and the wall 101 of the hoistway 100. This also creates a problem that the cross sectional area of the hoistway 100 increases, leading to a reduction in space efficiency.

FIGS. 11A and 11B show the power supplying device for an elevator disclosed in Japanese Unexamined Patent Application Publication No. 9-56088.

This power supplying device for an elevator comprises a fixed-side power supplying member 3 disposed at the top of a hoistway 100; an inverter power supplying member 10 connected to the fixed-side power supplying member 3; a power feeding line 11 disposed along the travel path in the hoistway 100 from the inverter power supplying member 10; a power receiving member 5 disposed on a car 1 traveling within the hoistway 100; a pickup 12 comprising a high-frequency transformer which supplies power to the power receiving member 5 by electromagnetic induction, while being brought close to the power feeding line 11 in a noncontact state; a battery 13 disposed between the pickup 12 and the power receiving member 5.

FIG. 12 is a control block diagram of the power supplying device for an elevator, having the above-described features.

The power supplying device for an elevator comprises a inverter power supplying member 10, a power feeding line 11 connected to the inverter power supplying member 10, a pickup 12 approaching the power feeding line 11 in a noncontact state, and a power receiving member 5 electrically connected with the pickup 12.

The power receiving member 5 comprises a rectifying circuit 31 for rectifying the outputs received by the pickup 12, a stabilization circuit 32 for stabilizing the rectified outputs, a smoothing circuit 33 for smoothing the stabilized outputs, and a control circuit 34 for exercising various controls by the smoothed outputs.

As shown in FIG. 13A, the inverter power supplying member 10 has a DC driving circuit 40, and a switching circuit 41 for converting the DC voltage of the DC driving circuit 40 into AC voltage. The inverter power supplying member 10 outputs the AC voltage converted by the switching circuit 41 to the power feeding line 11.

Meanwhile, no example has been found in which the above-described pickup 12 is applied to a plural car elevator. As shown in FIG. 13B, however, a construction is suggested in which the first and second pickups 12*a* and 12*b* of the respective plural cars 1*a* and 1*b* enter in series in the power feeding line 11.

In a plural car elevator, one of the cars may be out of operation, and a cooler is turned on or turned off depending on a car, or the like. That is, there are variations in the load between cars. In this case, since the first and second pickups 12*a* and 12*b* enter in series in the power feeding line 11, and the voltage is divided between the pickups 12*a* and 12*b*, the load causes a fluctuation in of one of the cars 1*a* fluctuates the voltage applied to the other car 1*b*. Also, in each of the cars 1*a* and 1*b*, the current flowing through the power feeding line 11 fluctuates in accordance with the load fluctuation.

Thus the power supplied to each of the cars 1*a* and 1*b* via the first and second pickups 12*a* and 12*b* is not stable.

As described above, in the power supplying device for a plural car elevator, having the above-described features shown in FIG. 9, when supplying power to the cars 1*a* and 1*b* using the cables 4*a* and 4*b*, there is a problem that, once the car 1*a* and 1*b* approach each other, the folded portion 80*a* of the first cable 4*a* of the first car 1*a* can make contact with the upper portion of the second car, so that the folded portion 80*a* of the first car can be caught on the second car, resulting in a reduction in the lifetime. Furthermore, for example, in order to obtain a bending curvature required for the cables 4*a* and 4*b*, it is necessary to secure a large space between the cars 1*a* and 1*b*, and the wall 101 of the hoistway 100. This also raises a problem that the cross sectional area of the hoistway 100 increases, leading to a reduction in the space efficiency.

Moreover, when supplying power to plural car by the noncontact system using the pickups 12*a* and 12*b*, there is a problem that under the influence of the fluctuation of the power supply load to one of the cars, the amount of the power applied to the other car 1*b* fluctuates, thereby making it difficult to stably supply power to each of the cars.

SUMMARY OF THE INVENTION

Accordingly, it is an object of the present invention to solve the above-described problems, and to provide a power supplying device for a plural car elevator, capable of preventing the cable of one car thereof from making contact with the other car, without increasing the size of a hoistway.

It is another object of the present invention to provide a noncontact-type power supplying device for a plural car elevator, capable of stably supplying power to each of the cars even if power supply load to each of the cars fluctuates.

The power supplying device for a plural car elevator in accordance with a first aspect of the present invention, comprises a power supplying member disposed on the topside of a hoistway, for supplying power to each of a plurality of cars moving up and down along guide rails within one hoistway; a power receiving members installed on each of the cars, for receiving the power from the power supplying member; a plurality of cables for conducting the power from the power supplying member to each of the power receiving member. In this power supplying device for a plural car elevator, one end of each of the cables is fixed on the side of each of the cars, and each of the cables is disposed along one of the sides of each of the cars in the gap formed between the inner wall of the hoistway and the side of each of the cars opposed to the inner wall.

Furthermore, in the power supplying device for a plural car elevator in accordance with the first aspect of the present invention, preferably, first cable one end of which is fixed to a first car, and second cable one end of which is fixed to a second car are disposed through the intermediary of a guide rail.

Moreover, in the power supplying device for a plural car elevator in accordance with the first aspect of the present invention, preferably, preferably, a portion of the second cable is disposed in the one side space of a counter provided in the gap between the inner wall of the hoistway and the rear surface of the car.

The power supplying device for a plural car elevator in accordance with a second aspect of the present invention, comprises a power supplying member for supplying power to a plurality of cars moving up and down along guide rails within one hoistway; a power receiving member installed on each of the cars, for receiving the power from the power supplying member; a power feeding line electrically connected with the power supplying member, the power feeding line being disposed along the travel path in the hoistway; a pickup disposed on each car, the pickup supplying power to each of the power receiving members by electromagnetic induction, while being brought close to the power feeding line in a noncontact state; and current control means for controlling the current flowing through the power feeding line so as to be constant value.

Furthermore, in the power supplying device for a plural car elevator in accordance with the second aspect of the present invention, preferably, the current control means comprises a dummy pickup for detecting the current flowing through the power feeding line, and a control circuit for controlling the current flowing through the power feeding line at a constant value based on the detected current value.

Moreover, in the power supplying device for a plural car elevator in accordance with the second aspect of the present invention, preferably, the current control means is provided for the power feeding line, and the current control means is an LC circuit having the same resonance frequency as the frequency of the power supply voltage of the power supplying member, the power supply voltage being constant.

The above and other objects, features and advantages of the present invention will be apparent from the following detailed description of the preferred embodiments of the invention in conjunction with the accompanying drawings, wherein the same parts as and equivalent parts to those in conventional art in each of the several figures are identified by the same reference numeral.

DESCRIPTION OF THE PREFERRED EMBODIMENTS

First Embodiment

Figure 1:
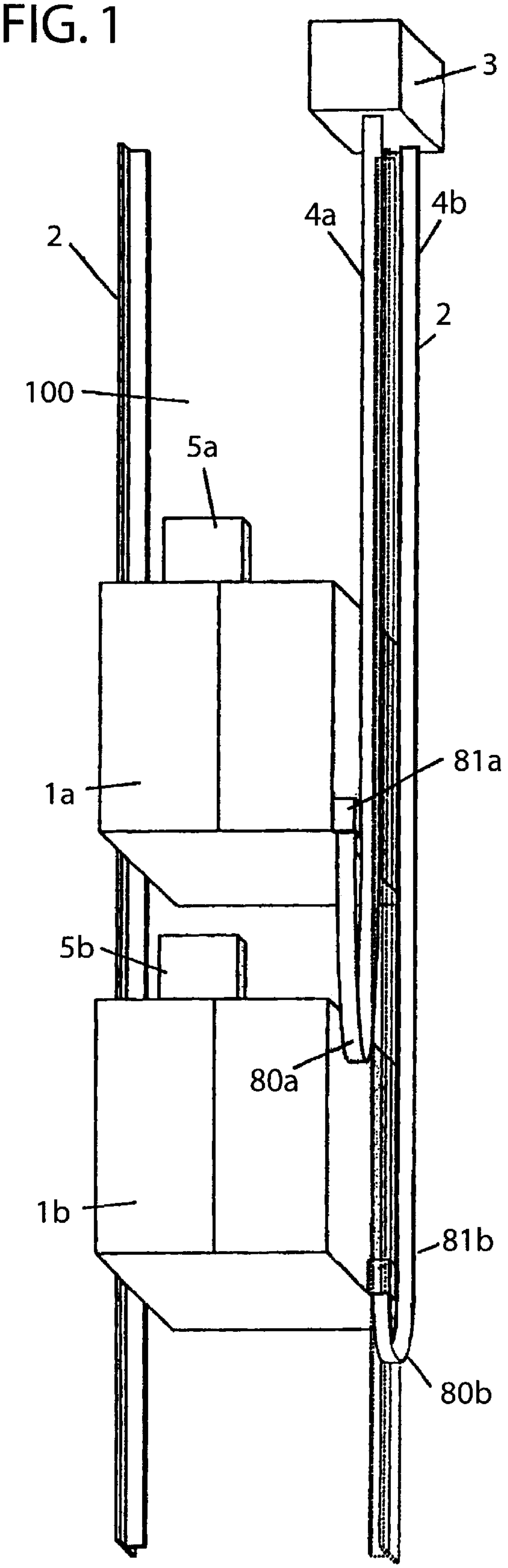
FIG. 1 is a perspective view showing the schematic construction of a power supplying device for a plural car elevator in accordance with a first embodiment of the present invention.

In FIG. 1, a power supplying device for a plural car elevator in accordance with a first embodiment of the present invention is shown.

This power supplying device for a plural car elevator in accordance with the first aspect of the present invention, comprises a fixed-side power supplying member 3 disposed on the topside of a hoistway 100; first and second power receiving members 5*a* and 5*b* installed on respective first and second cars 1*a* and 1*b* traveling along guide rails 2 within one hoistway 100; first and second cables 4*a* and 4*b* for supplying power, the first and second cables 4*a* and 4*b* being lowered from the fixed-side power supplying member 3 toward the first and second cars 1*a* and 1*b*, and being connected to the first and second power receiving members 5*a* and 5*b* via upwardly-folded portions 80*a* and 80*b*, respectively.

The first cable 4*a* is fixed at a installation portion 81*a* at the front side of one of the sides of the first car 1*a*. The second cable 4*b* is fixed at a installation portion 81*b* at the rear side of one of the sides of the second car 1*b*. The first cable 4*a* is disposed between the side of the first car 1*a* and the wall 101 of the hoistway 100, and at the front of the guide rail 2. The second cable 4*b* is disposed between the side of the first car 1*a* and the wall 101 of the hoistway 100, and behind the guide rail 2.

Figure 7:
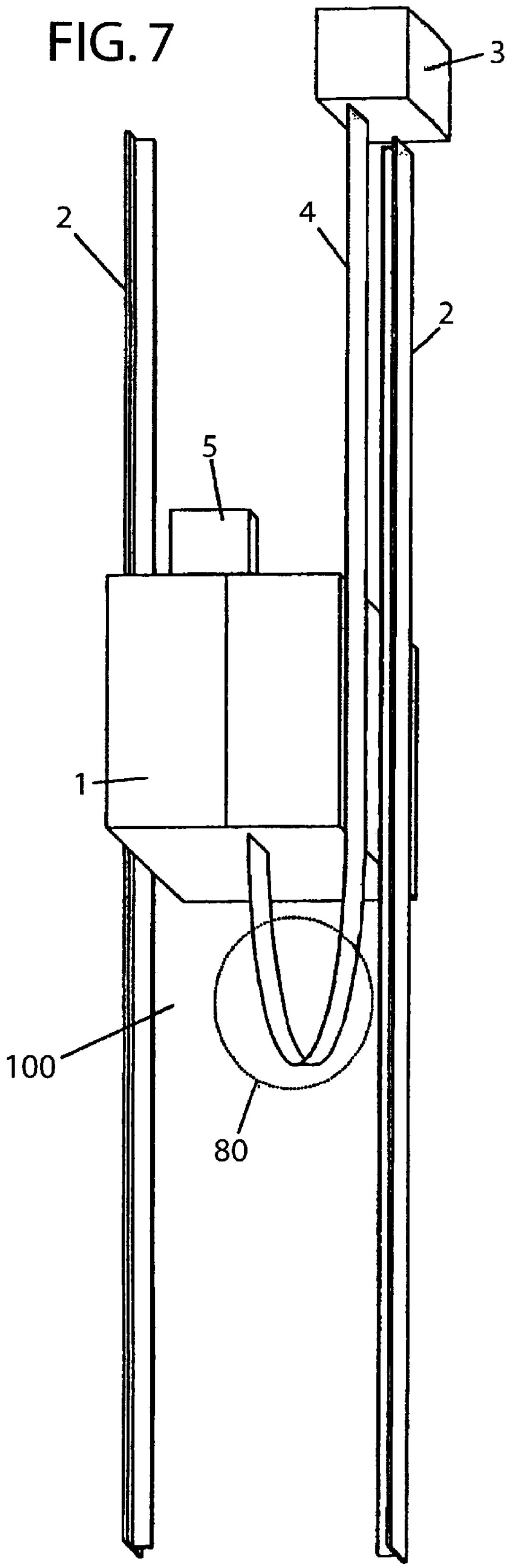
FIG. 7 is a perspective view showing the schematic construction of a conventional power supplying device for an elevator.
Figure 8:
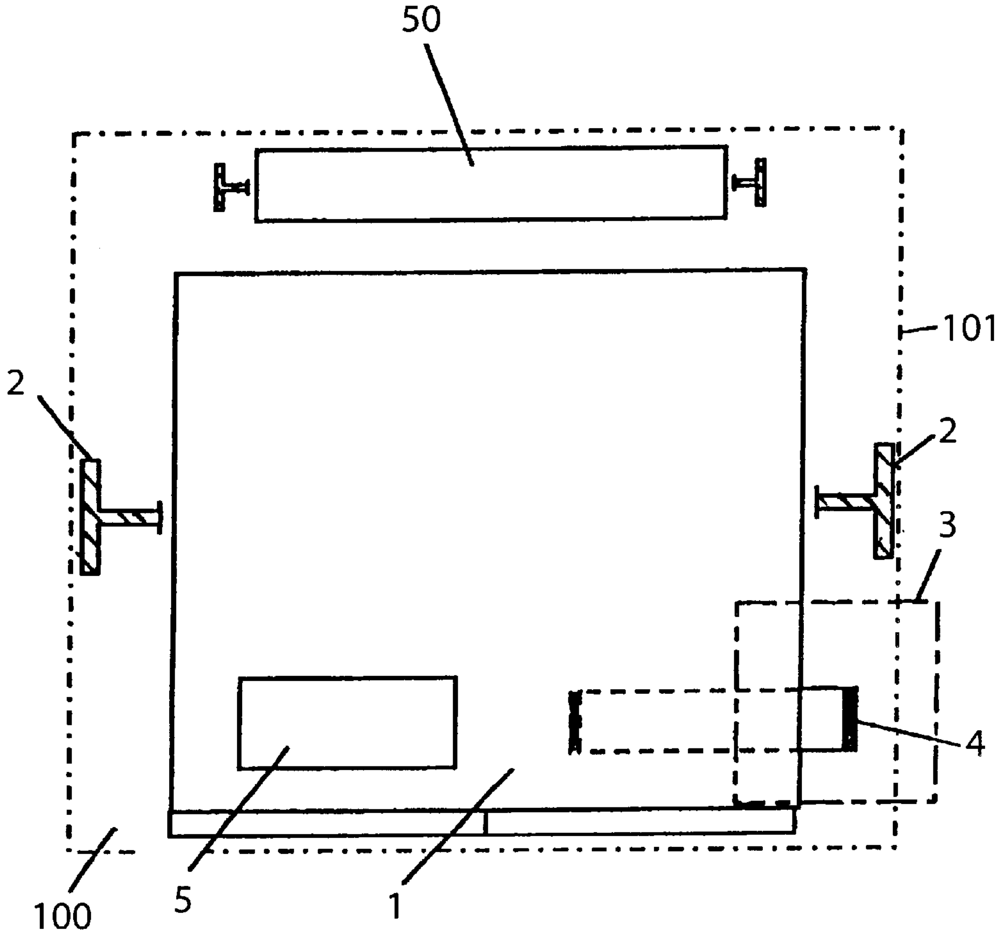
FIG. 8 is a transverse sectional view of the power supplying device for a plural car elevator shown in FIG. 7.
Figure 9:
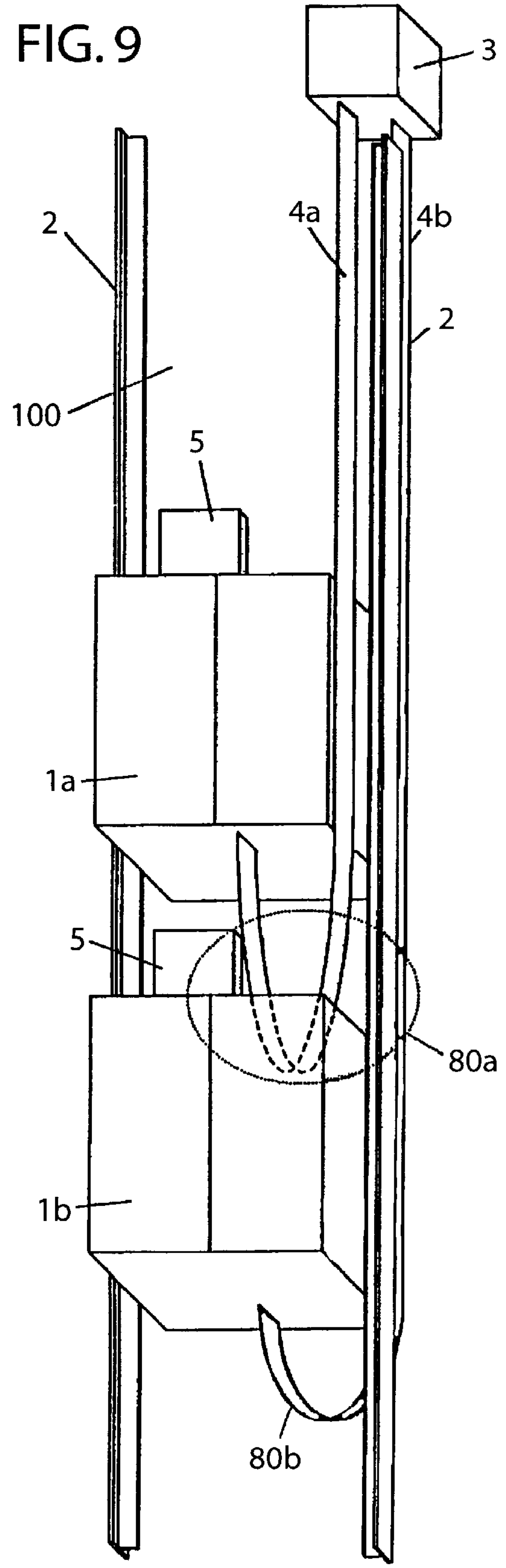
FIG. 9 is a perspective view showing the schematic construction in which plural cars are powered by the conventional cable connection.
Figure 10A:
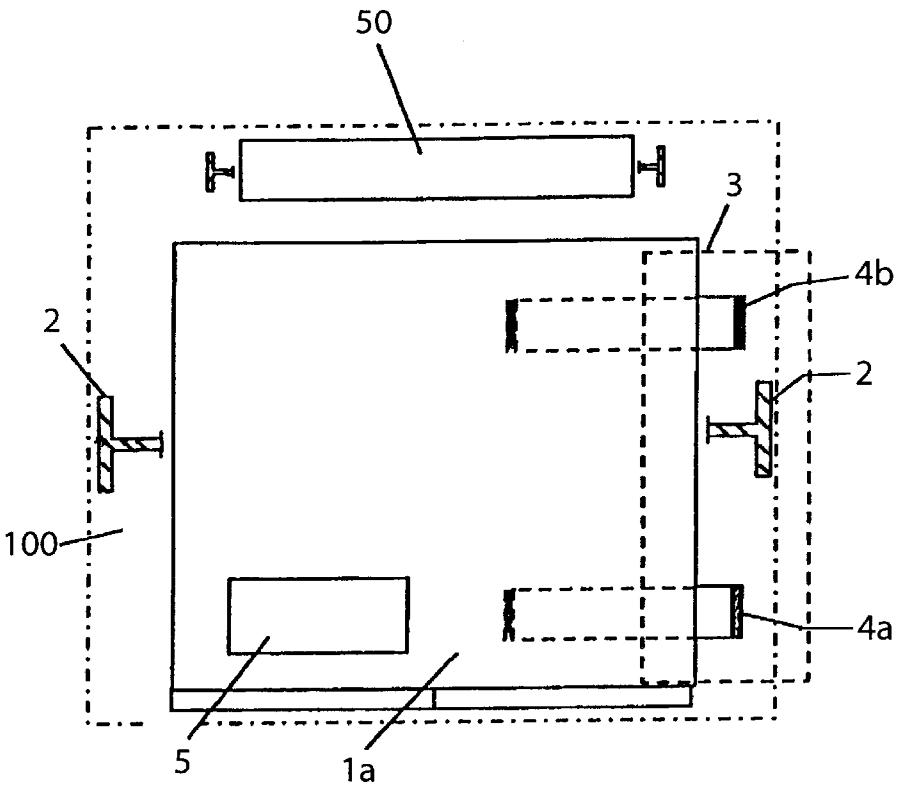
FIG. 10A is a transverse sectional view of the power supplying device for a plural car elevator shown in FIG. 9.
Figure 10B:
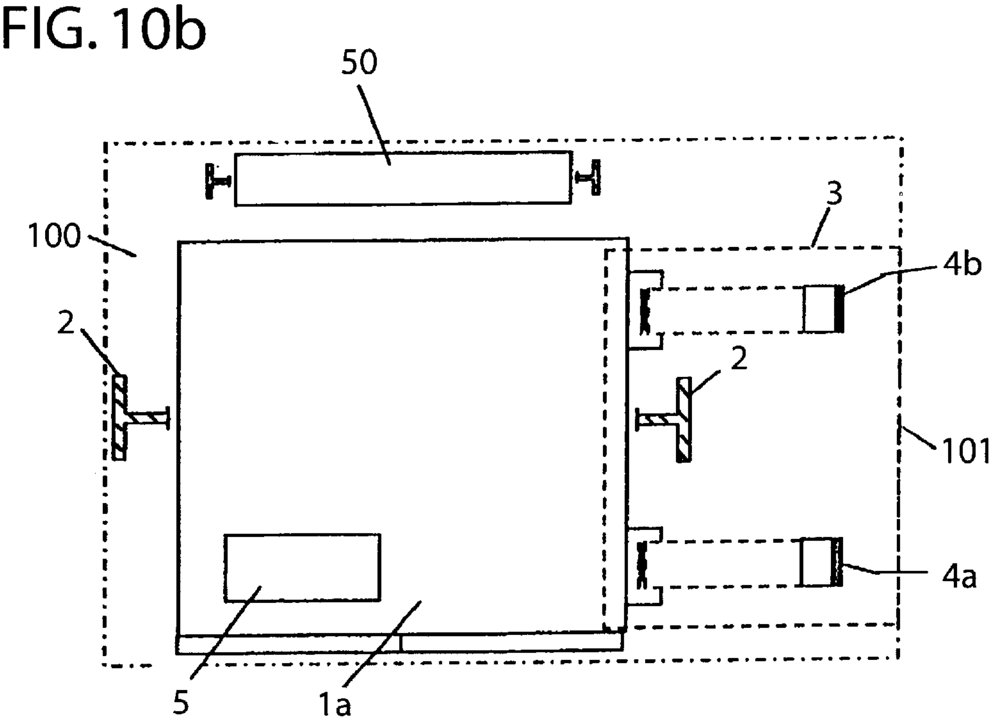
FIG. 10B is a transverse sectional view of the power supplying device for a plural car elevator in which the cables in FIG. 10A are disposed on the side of the car.
Figure 11A:
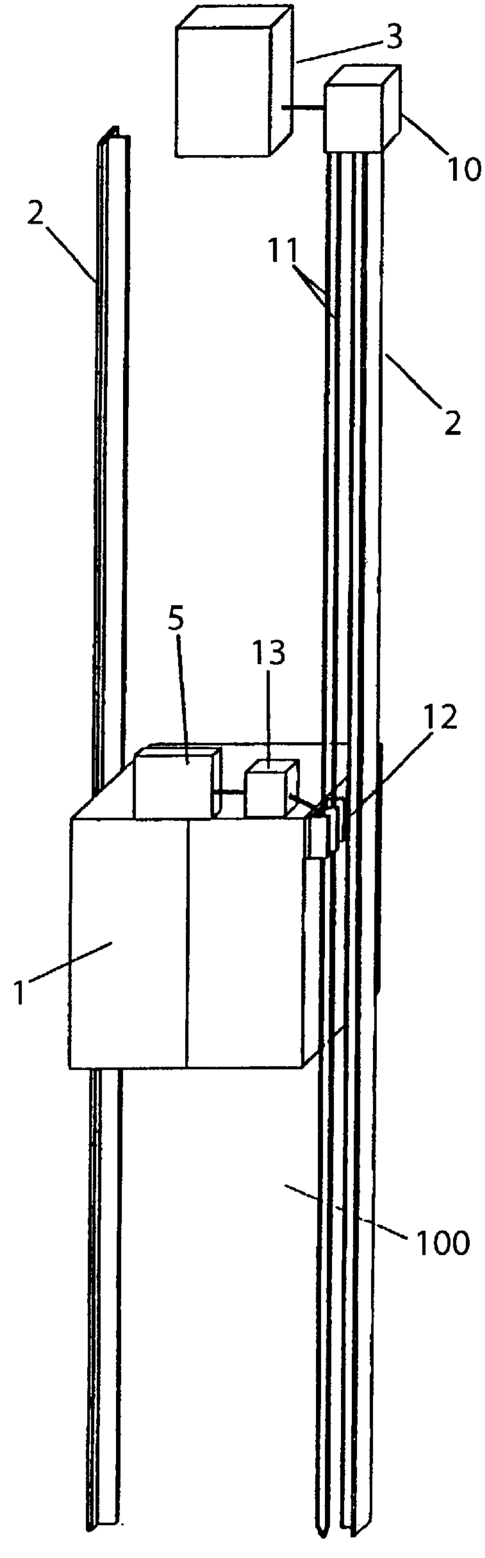
FIG. 11A is a perspective view showing the schematic construction of a conventional noncontact-type power supplying device for an elevator.
Figure 11B:
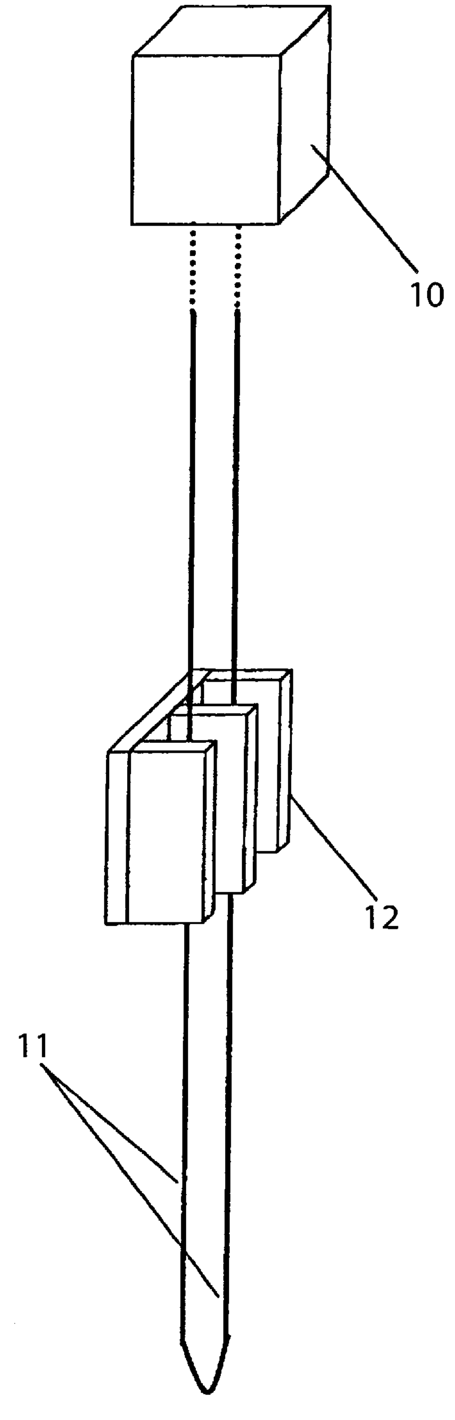
FIG. 11B is a enlarged view of the pickup shown in FIG. 11A.

In the power supplying device for a plural car elevator, having the above-described features, since the installation portions 81*a* and 81*b* of the cables 4*a* and 4*b* are disposed at the sides of the car 1*a* and 1*b*, respectively, and the folded portions 80*a* and 80*b* of the cables 4*a* and 4*b*, which are folded along the side of the car 1*a* and 1*b*, are disposed at the front and rear sides, respectively, in the gap between the cars 1*a* and 1*b*, and the wall 101, the cables 4*a* and 4*b* are capable of securing an equal curvature radius as that of the single car type elevator shown in FIG. 7 without interfering with the respective other cares 1*b* and 1*a*. Also, substantially the same space of the hoistway 100 as that of the single car type elevator is good enough for the present power supplying device for a plural car elevator.

Figure 2:
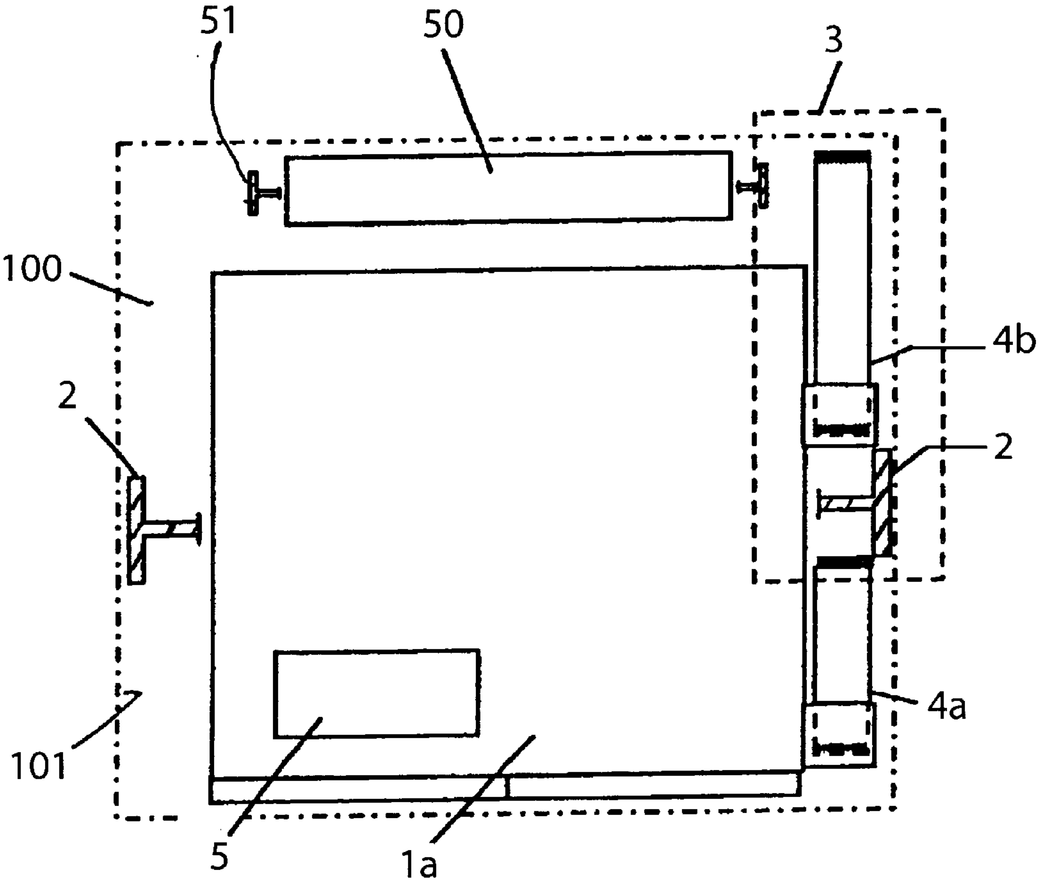
FIG. 2 is a transverse sectional view of the power supplying device for a plural car elevator shown in FIG. 1.

In general, the width of a counter 50 is smaller than that of the car 1*a* and 1*b*, and consequently, even though the counter 50 are provided with rails 51, spaces are formed on both outer sides of the rails 51. As shown in FIG. 2, therefore, by disposing the second cable 4*b* in the gaps between the cars 1*a* and 1*b*, and the wall 101, including the outside space, a wide space can be utilized for the disposition of the cable 4*b*.

Also, the cables 4*a* and 4*b* may be disposed in the gaps between the counter 50 and the sides of the cars 1*a* and 1*b*, or may be disposed at the outside of the rail 2 or behind the counter 50.

Second Embodiment

Figure 3A:
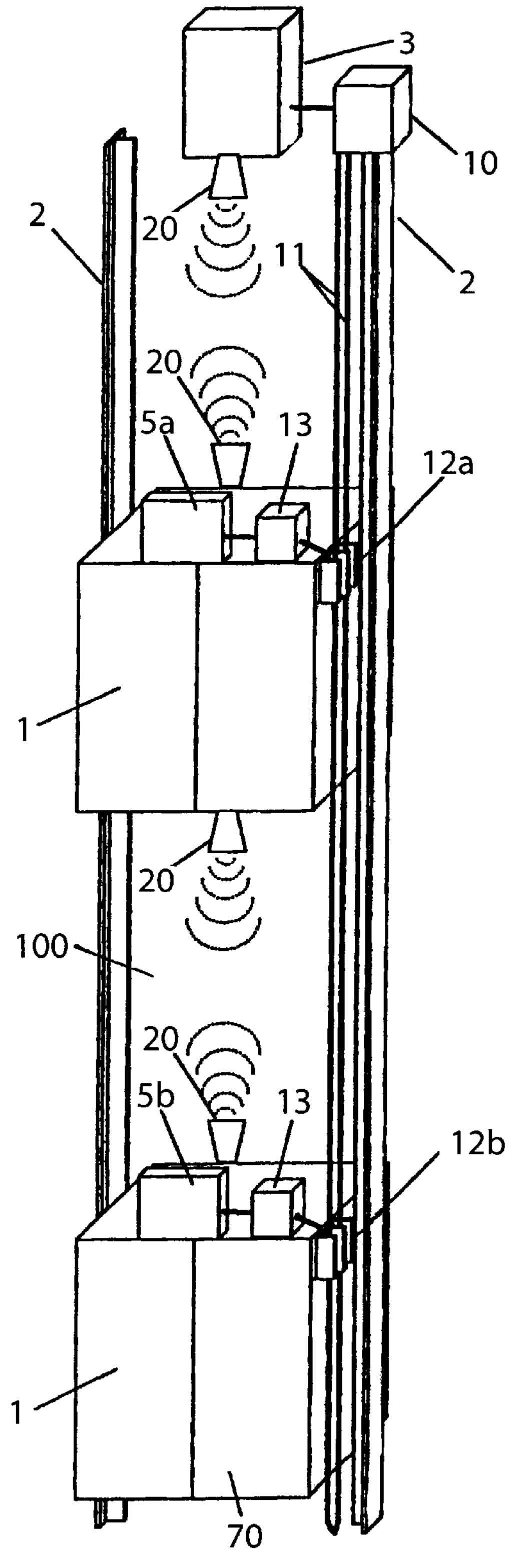
FIG. 3A is a perspective view showing the schematic construction of a power supplying device for a plural car elevator in accordance with a second embodiment of the present invention.
Figure 3B:
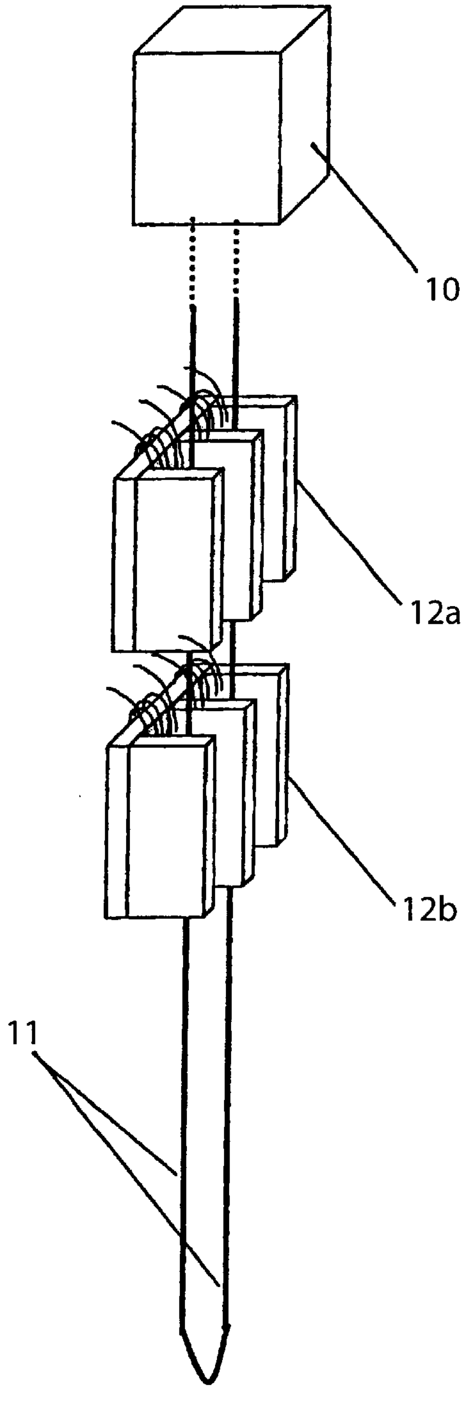
FIG. 3B is a enlarged view of the pickups shown in FIG. 3A.

Next, the power supplying device for a plural car elevator in accordance with a second embodiment of the present invention will be shown using FIGS. 3A and 3B.

This power supplying device for an elevator comprises a fixed-side power supplying member 3 disposed on the topside of a hoistway 100; an inverter power supplying member 10 connected to the fixed-side power supplying member 3; a power feeding line 11 disposed along the travel path in the hoistway 100 from the inverter power supplying member 10; first and second power receiving members 5*a* and 5*b* installed on respective first and second cars 1*a* and 1*b* traveling along guide rails 2 within the hoistway 100; first and second pickups 12*a* and 12*b* each comprising high-frequency transformers which feed powers to the power receiving members 5*a* and 5*b*, respectively, by electromagnetic induction, while being brought close to the power feeding line 11 in a noncontact state; current control means for controlling the current flowing through the power feeding line 11 so as to be constant value; batteries 13 disposed between the first and second pickups 12*a* and 12*b*, and the first and second power receiving members 5*a* and 5*b*, respectively. Here, batteries 13 is not necessarily required to be provided. The transmission of signals to the cars 1*a* and 1*b* is performed by, for example, a noncontact type signal transmission member 20 using electromagnetic waves.

Figure 12:
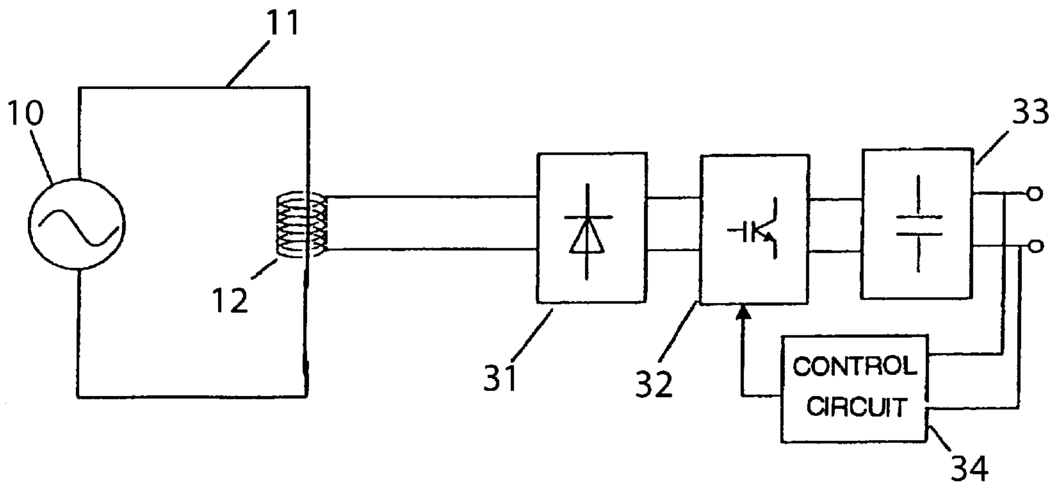
FIG. 12 is a control block diagram of the power supplying device for an elevator.
Figure 13A:
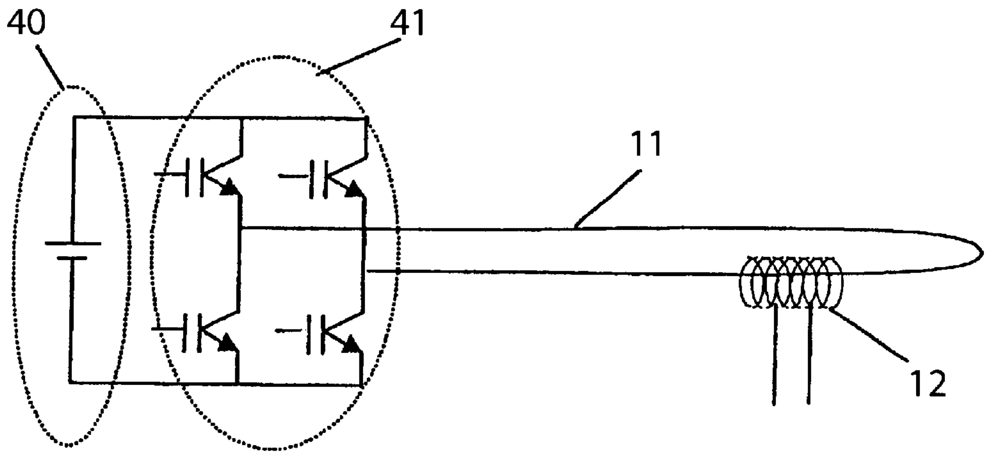
FIGS. 13A and 13B are each electric circuit diagrams for inverter power supplying members.
Figure 13B:
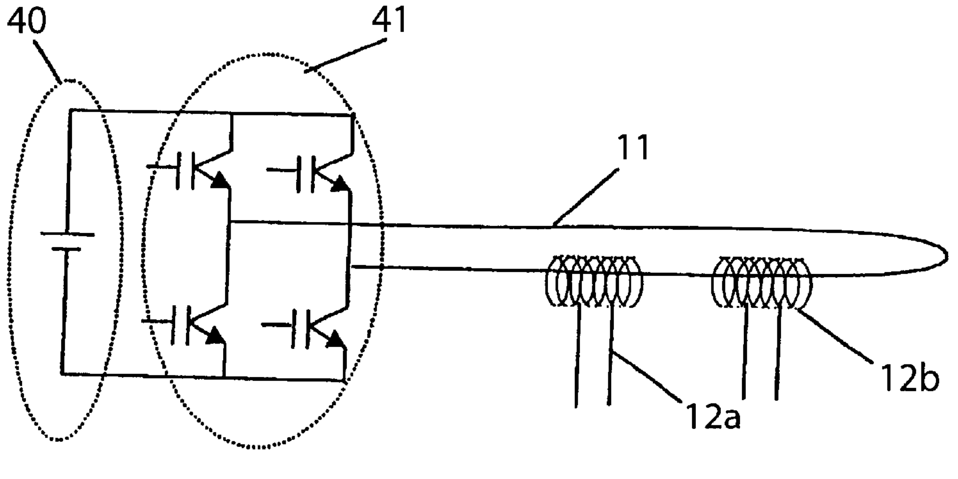

As in the case of the power receiving member 5 shown in FIG. 12, the first and second power receiving members 5*a* and 5*b* comprises a rectifying circuit 31 for rectifying the outputs received by the pickups 12*a* and 12*b*, a stabilization circuit 32 for stabilizing the rectified outputs, a smoothing circuit 33 for smoothing the stabilized outputs, and a control circuit 34 for exercising various controls by the smoothed outputs.

Figure 4:
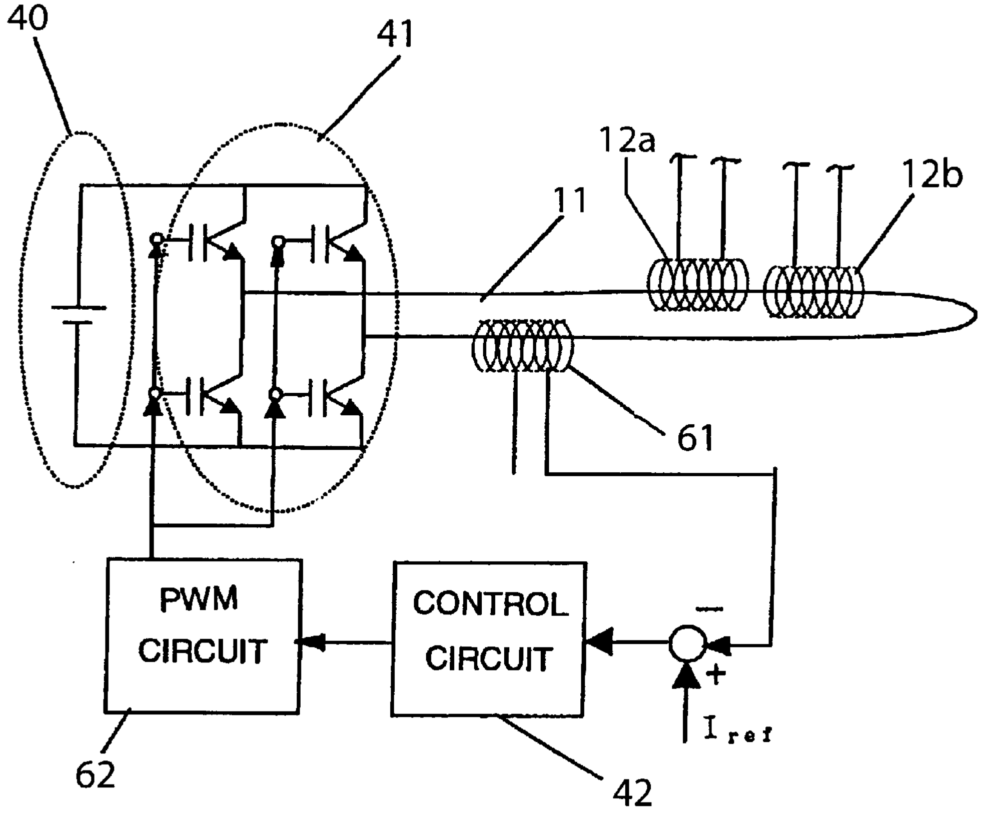
FIG. 4 is a control block diagram of the power supplying device for a plural car elevator shown in FIG. 3.

As shown in FIG. 4, the inverter power supplying member 10 has a DC driving circuit 40, and a switching circuit 41 for converting the DC voltage of the DC driving circuit 40 into AC voltage. The inverter power supplying member 10 outputs the AC voltage converted by the switching circuit 41 to the power feeding line 11.

The current control means has a dummy pickup 61 (omitted in FIG. 3) for detecting the current flowing through the power feeding line 11, and a control circuit 42 which compares the value of the detected current with that of an instruction current $I_{ref}$, and transmits an instruction voltage signal to a PWM (pulse-width modulation) circuit 62 so that a current differential between the detected current and the instruction current becomes zero. The PWM circuit 62 is arranged to generate PWM signal so that the switching circuit 41 outputs a voltage corresponding to the instruction voltage signal.

In the power supplying device for a plural car elevator, having the above-described features, the current flowing through the power feeding line 11 is detected by the dummy pickup 61. The value of the detected current is compared with the instruction current value I by the control circuit 42, and a signal which makes the current flowing through the power feeding line 11 constant based on the current differential, is transmitted to the inverter power supplying member 10 via the PWM circuit 62. Therefore, even though a fluctuation of the power supply load to the first car 1*a* is caused, the voltage of the inverter power supplying member 10 which is the power supplying side, changes in response to the load. Consequently, the first and second cars 1*a* and 1*b* are each provided with desired powers without being subjected to the influence of a load fluctuation of the first car 1*a*.

Figure 5:
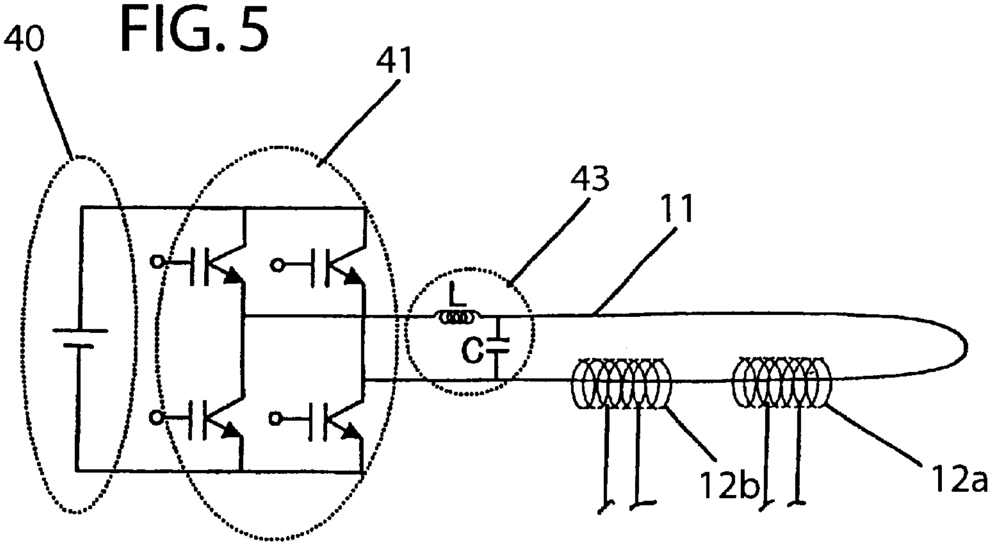
FIG. 5 is another control block diagram of the power supplying device for a plural car elevator.

FIG. 5 is a view showing another current control means for making constant the value of the current flowing through the power feeding line. In this example, the frequency of the power supply voltage of the inverter power supplying member 10 is set to a constant value, and there is provided an LC filter 43 (current control means) as an LC circuit having the same resonance frequency as the above-mentioned frequency.

In this construction, letting the frequency at the power supplying side be $f_0$, and letting the constants of the inductor L and the capacitor C in a current-constant circuit be $L_1$ and $C_1$, respectively, the frequency $f_0$ is determined from the following equation.

$$f_0=½π(L_1·C_1)^{1/2}$$

With this construction, this power supplying device operates so that the current at the power supplying side is driven in a constant current condition. The needed current, therefore, can be taken out in response to the requirements of the pickups 12*a* and 12*b*. Particularly, in this device, since the frequency at the power supplying side is constant, L and C can be set to certain constants. This leads to the simplification of the structure of this device.

In the power supplying device for a plural car elevator shown in FIG. 4, it is necessary to provide a high-speed and complicated control circuit 42 which instantaneously controls current in response to the load fluctuation of the first and second cars 1*a* and 1*b*. On the other hand, in the power supplying device for an elevator shown in FIG. 5, the power supplying device using the LC filter 43 as current control means, the above-mentioned constants may change with a change in temperature or the like, although it is intended to maintain the current in the power supplying side constant. However, if the fluctuation to such a extent is allowed, there is no need for a control circuit. Furthermore, when correcting the change of a constant, there is no need for a rapid response speed. A correcting circuit (not shown) having a simple construction would be good enough to control current.

Also, any current control means capable of driving the current at the power supplying side in a constant-current condition would be able to achieve the same effect even with another construction.

Figure 6:
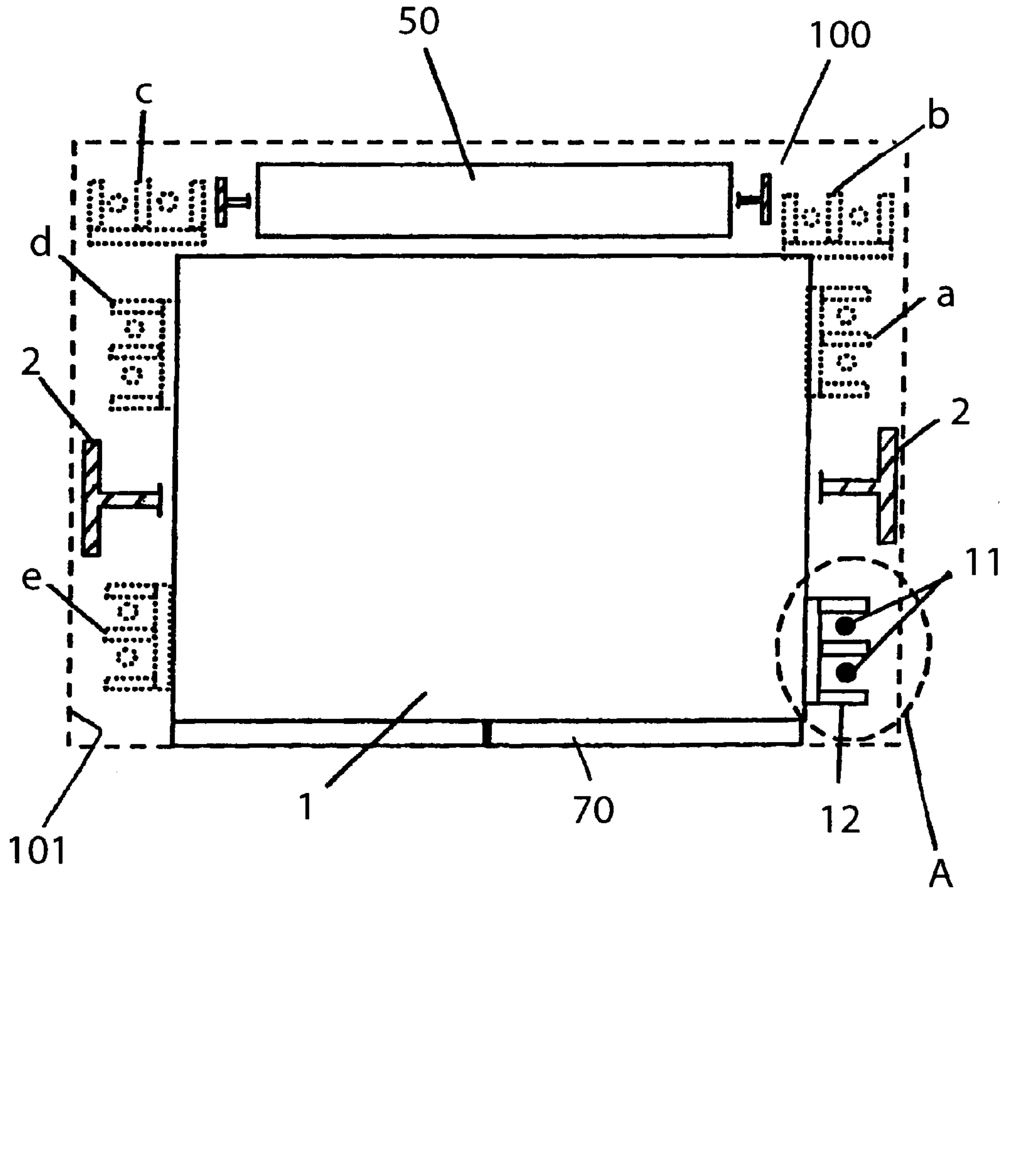
FIG. 6 is a transverse sectional view of the power supplying device for a plural car elevator shown in FIG. 3.

In the example shown in FIG. 3, a power feeding line 11 and pickups 12*a* and 12*b* (the portion A in FIG. 6) are each provided at the doors 70 sides of the cars 1*a* and 1*b*. Alternatively, however, the power feeding line 11 and the pickups 12*a* and 12*b* may be disposed in a gap such as a portion a, b, c, d, or e shown in FIG. 6. In particular, since the sides of each of cars 1*a* and 1*b* with the guide rails installed have gaps which the guide rail to occupy, the power feeding line 11 and the pickups 12*a* and 12*b* may be disposed in any of these gaps without increasing the entire size of the hoistway 100.

As described hereinabove, in the power supplying device for a plural car elevator in accordance with the first aspect of the present invention, since the power supplying device for a plural car elevator comprises a power supplying member disposed on the topside of a hoistway, for supplying power to each of a plurality of cars moving up and down along guide rails within one hoistway; a power receiving members installed on each of the cars, for receiving the power from the power supplying member; a plurality of cables for conducting the power from the power supplying member to each of the power receiving member, wherein one end of each of the cables is fixed on the side of each of the cars, and each of the cables is disposed along one of the sides of each of the cars in the gap formed between the inner wall of the hoistway and the side of each of the cars opposed to the inner wall, there is no risk that the cable of the upper car contacts with the lower car even though the two cars approach each other, it is possible to prevent the cable of one car from making contact with the other car without making the hoistway size larger than that of a single car type elevator.

Furthermore, in the power supplying device for a plural car elevator in accordance with the first aspect of the present invention, since the first and second cables are disposed through the intermediary of the guide rail, utilizing, for disposing the cables, the gaps occurred as a result of the installation of the guide rail, there is no need to take the trouble to provide a space dedicated to the cables.

Moreover, in the power supplying device for a plural car elevator in accordance with the first aspect of the present invention, one portion of the second cable is disposed in one side space of the counter provided in the gap between the inner wall of the hoistway and the rear surface of the car, that is, one side space of the counter is effectively utilized as the space for a cable.

In the power supplying device for a plural car elevator in accordance with the second aspect of the present invention, even though a fluctuation of the power supply load is caused, since the voltage of the power supplying member which is the power supplying side, changes in response to the load, a desired power can be supplied to each of the cars.

Furthermore, in the power supplying device for a plural car elevator in accordance with the second aspect of the present invention, since the current control means thereof has a dummy pickup for detecting the current flowing through the power feeding line and a control circuit for controlling the current, the value of the current flowing through the power feeding line can be made constant with a high response and a high accuracy.

Moreover, in the power supplying device for a plural car elevator in accordance with the second aspect of the present invention, since the current control means thereof is an LC circuit having the same resonance frequency as the frequency of the power supply voltage of the power supplying device, the power supply voltage being constant, and the frequency at the power supplying side is constant, it is possible to set the inductor L and the capacitor C to a certain constant, and to make constant the value of the current flowing through the power feeding line, with ease and at a low cost.

While the invention has been described in its preferred embodiments, obviously many modifications and variations of the present invention are possible in the light of the above teachings. It is therefore to be understood that within the scope of the appended claims, the invention may be practiced otherwise than as specifically described.

What is claimed is:

1. A power supplying device for a plural car elevator, comprising:

a plurality of elevator cars moving in a single hoistway;

a power supplying member disposed at a top of the hoistway for supplying power to each of said elevator cars moving up and down within the hoistway;

power receiving members installed on each of said elevator cars for receiving power from said power supplying member; and a plurality of cables, each cable having a substantially rectangular cross-section and conducting power from said power supplying member to a corresponding power receiving member, wherein one end of each respective cable is installed on a side of the corresponding elevator car and each of said cables is disposed along the side of each of said elevator cars in a gap between an inner wall of the hoistway and the side of each of said elevator cars, opposite the inner wall, and the lengthwise side of each cable extends generally perpendicular to the side of said elevator car to which said cable is connected.

2. The power supplying device for a plural car elevator as claimed in claim 1, wherein said plurality of cables includes a first cable, one end of which is fixed to a first elevator car, and a second cable, one end of which is fixed to a second elevator car, and a guide rail which extends between said first and second cables.

3. The power supplying device for a plural car elevator as claimed in claim 2, wherein a portion of said second cable is disposed in a side space of a counterweight located in the gap between the inner wall of the hoistway and a rear surface of said second car.

4. A power supplying device for a plural car elevator, comprising:

a plurality of elevator cars moving in a single hoistway;

a power supplying member for supplying power to a plurality of elevator cars moving up and down along guide rails within the hoistway;

power receiving members installed on each of said elevator cars for receiving power from said power supplying member;

a power feeding line electrically connected with said power supplying member, said power feeding line being disposed along a travel path in said hoistway;

pickups disposed on each of said elevator cars, said pickups supplying power to each of said power receiving members by electromagnetic induction, when brought close to but not in contact with said power feeding line; and current control means for controlling current flowing through said power feeding line to be constant.

5. The power supplying device for a plural car elevator as claimed in claim 4, wherein said current control means comprises a dummy pickup for detecting the current flowing through said power feeding line, and a control circuit for controlling the current flowing through said power feeding line to be constant based on the current detected.

6. The power supplying device for a plural car elevator as claimed in claim 4, wherein the power is AC power having a frequency and a constant amplitude, and said current control means comprises an LC circuit having a resonance frequency equal to the frequency of the power.

* * * * *